Dec. 20, 1955  R. S. JONES  2,727,352
BALE DROPPING TRAILER
Filed Sept. 26, 1952  2 Sheets-Sheet 1

Royce S. Jones
INVENTOR.

Dec. 20, 1955  R. S. JONES  2,727,352
BALE DROPPING TRAILER

Filed Sept. 26, 1952  2 Sheets-Sheet 2

Royce S. Jones
INVENTOR.

BY *Clarence A. O'Brien*
*and Harvey B. Jacobson*
Attorneys

United States Patent Office 2,727,352
Patented Dec. 20, 1955

2,727,352

BALE DROPPING TRAILER

Royce S. Jones, Davis, Okla.

Application September 26, 1952, Serial No. 311,731

11 Claims. (Cl. 56—473.5)

The invention relates to trailers or carriers and more particularly relates to a bale carrier adapted for attachment to a baler of a hay harvesting machine.

At present, as the hay harvesting machine moves over the field, the material to be baled is cut and automatically formed into bales, each bale being discharged onto the field as it is formed whereby considerable labor is involved in collecting these scattered bales and hauling them from the field.

Therefore, it is the primary object of the invention to provide a bale carrier for balers of the above described character that is adapted to be pivotally connected to the baler for collecting the bales as they are dispensed from the baler and for discharging the bales in piles so that they are conveniently arranged for hauling off the field.

Another object of the invention is to provide a bale carrier having a freely swinging bottom which is permitted to swing rearwardly in the carrier upon opening of the tail gate of the carrier.

A further object of the invention is to provide a carrier of the above-described character and having a novel means for maintaining the tail gate in closed position and releasably opening the same to permit the discharge of bales from the trailer or carrier.

Other objects of the invention are to provide a bale carrier that may selectively operate on wheels or runners; to provide a carrier having a bottom normally sloping toward the rear end of the carrier and being adapted to increase its angle of inclination upon opening of the tail gate of the carrier; to provide a carrier or trailer having a single tongue hitched for pivoting the same to a trailer; and, to provide a carrier that will prevent bales received therein from rolling back into the baling machine.

These, together with various ancillary objects and features which will later become apparent as the following description proceeds, are attained by this invention, a preferred embodiment of which is shown by way of example only in the accompanying drawings, wherein.

Referring now to the accompanying drawings in detail, it will be noted that like reference numerals are utilized to designate similar parts throughout the various views.

Figure 1:
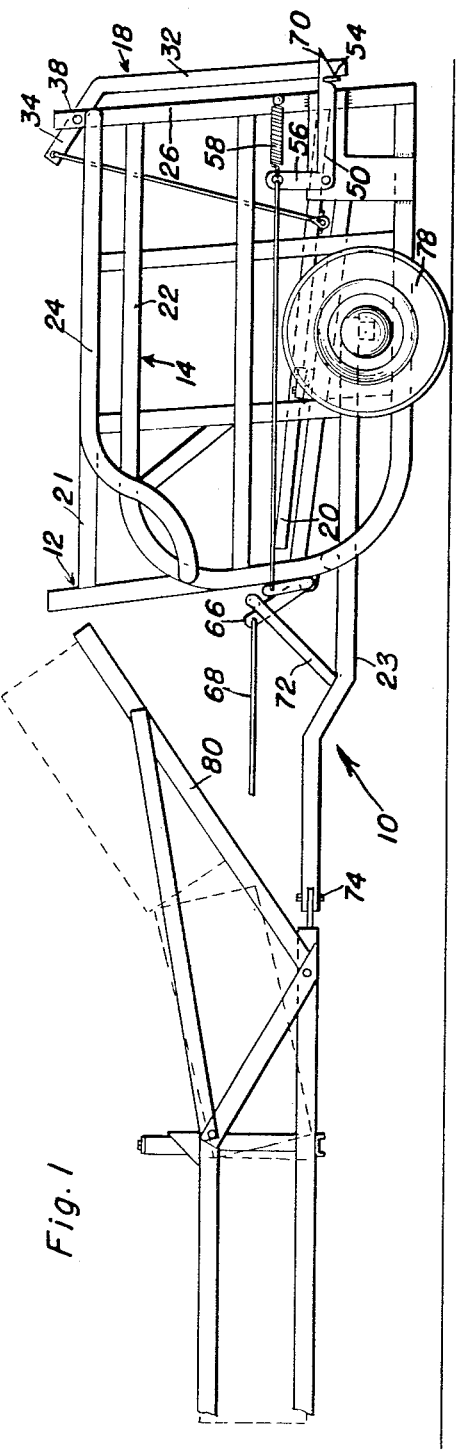
Figure 1 is a side elevational view of the baler trailer or carrier connected to a baler.
Figure 2:
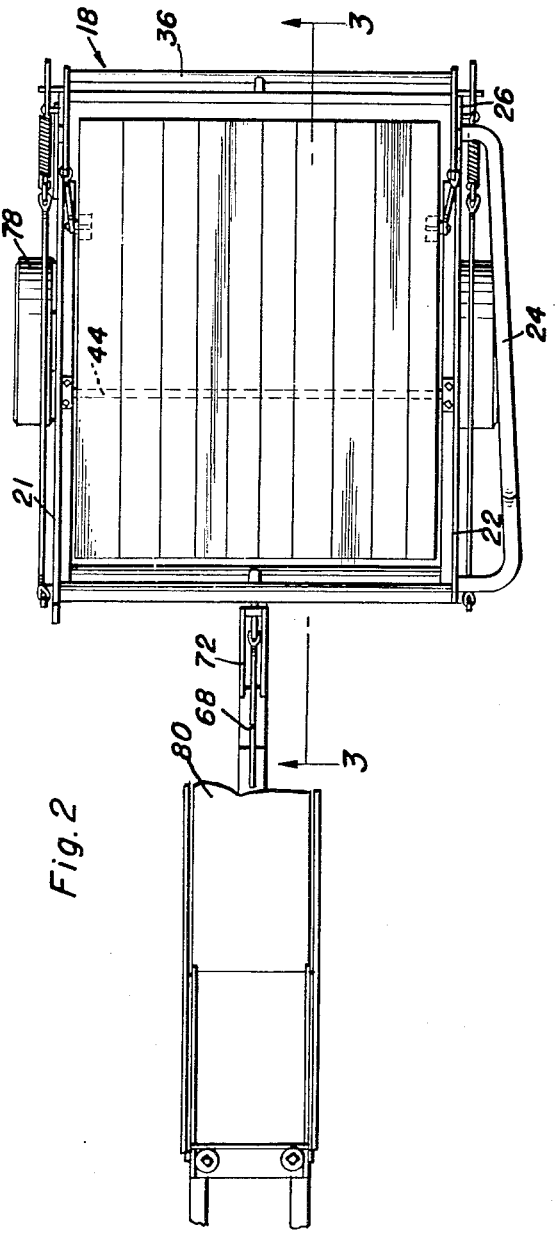
Figure 2 is a top elevational view of the bale carrier attached to a baler with a portion of the chute broken away.
Figure 3:
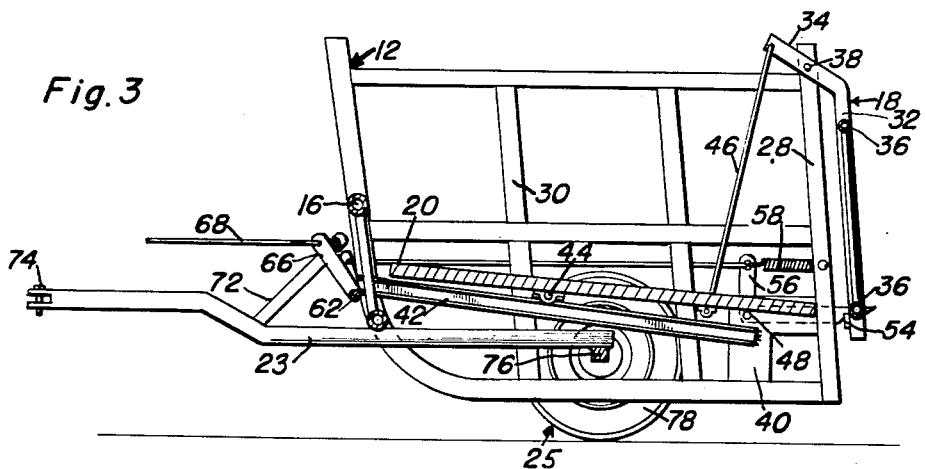
Figure 3 is a side elevational view in cross-section of the trailer or carrier per se taken substantially along section line 3—3 of Figure 2, certain parts being broken away for clarity of detail.

The bale carrier or trailer is indicated in its entirety by the numeral 10.

The trailer 10 is composed substantially of a supporting frame including a pair of sides or side walls 12 and 14, respectively, a front wall 16 and tail gate 18, floor, bed or bottom 20, tongue 23 and wheel and axle assembly 25. As will be noted from the drawings, each of the sides 12 and 14 is in the form of a substantially rectangular frame made up of tubular members or rails with the horizontal bottom rail of each side being upwardly curved so that these members may serve as runners for the trailer in the event the wheel assembly is not adapted for use under the prevailing conditions.

Figure 4:
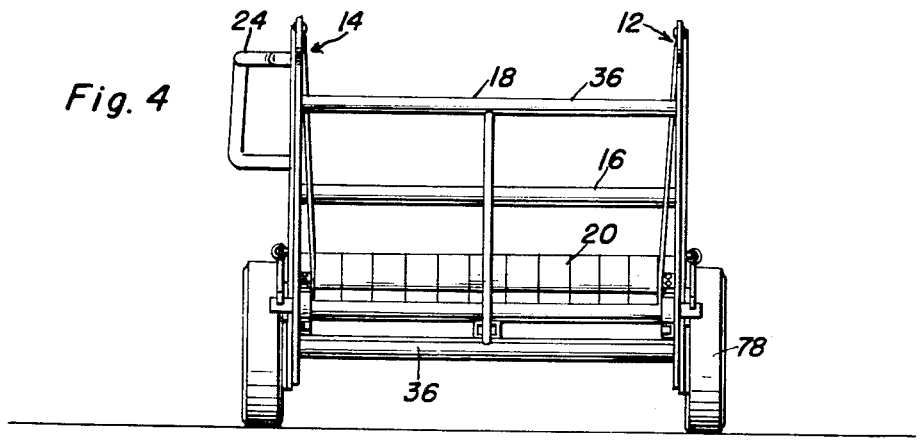
Figure 4 is a rear elevational view of the bale carrier.
Figure 5:
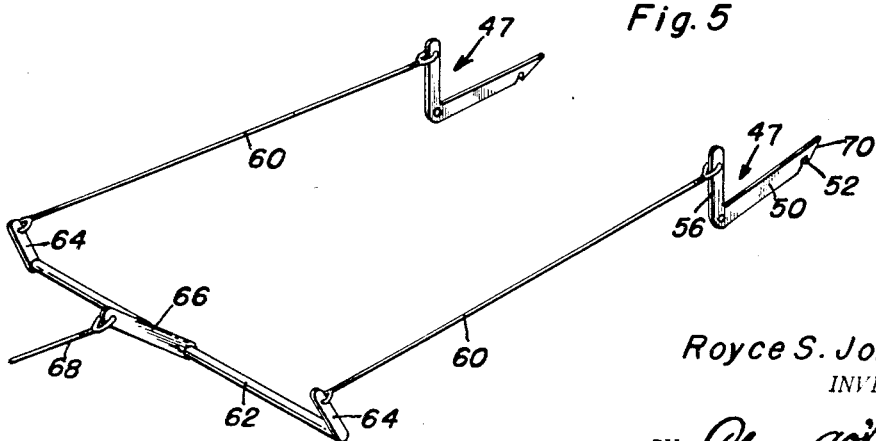
Figure 5 is an enlarged view of the controls for operating the end gate per se.

The top rail 21 of the side 12 is higher than the top rail 22 of the side 14 and a guide element or rail 24 is secured to the side 14. Referring particularly to Figures 1 and 4, it will be seen that this guide rail projects laterally from the side 14, curves upwardly and rearwardly therefrom until it is at substantially the same horizontal plane as the top rail 21 of the side 12 and then slants inwardly and is welded or otherwise secured to the rear end member 26 of the side 14. In this connection, it will also be noted that the forward end of the top rail 22 of the side 14 is curved in a substantially circular arc. The purpose of these different side wall constructions will later become apparent.

The side 12 has an end member 28 which is similar to the end member 26 of side 14 and it is to the upper ends of these rear end members 26 and 28 that tail gate 18 is swingably mounted. Any suitable cross-bracing as indicated by the numeral 30 may be utilized to stiffen the sides 12 and 14.

The tail gate 18 includes substantially vertically rising side members 32 having angulated upper ends 34. Cross members 36 secure the side members 32 to one another. Pins 38 passing centrally through the angulated upper ends or upper end portions 34 of the side members 32 swingably secure the tail gate 18 to the upper ends of the rear end members 26 and 28 of the sides 14 and 12.

At the lower rear corner of each of the sides 12 and 14, an angular bracket 40 is secured, one leg of the bracket being secured to the bottom rail of each of the sides and the other leg of each bracket being secured to the end member of each of the sides. Secured at one end to the bracket 40 on each side, is one end of a supporting beam 42, which slants upwardly and forwardly from each bracket and is secured at its other end to the forward rails of the sides 12 and 14. Extending transversely across the trailer and journalled at its ends on the beams 42 is a rod 44, which rod forms a fulcrum for the bottom 20 of the trailer 10. The bottom 20 is mounted for free, swinging movement intermediate its ends about the fulcrum bar 44 and is disposed so that the major portion of the bottom is disposed rearwardly of the fulcrum bar 44. By this arrangement, the bottom 20 will tend to slope downwardly and rearwardly from the forward end 16 of the trailer frame to the tail gate 18.

The angulated upper ends 34 of the side members 32 of the tail gate 18 overlie the rear end portion of the bottom 20 of the trailer and flexible members or means such as cables, chains or the like 46 interconnect the ends of the angulated upper ends 34 to the side edges of the bottom 20 rearwardly of the fulcrum 44 to limit the rearward swinging movement of the floor or bottom 20 about the fulcrum 44. With this arrangement, when the tail gate 18 is opened, the flexible members 46 are slackened and the bottom 20 is permitted to swing about the fulcrum bar 44 to increase its rearwardly sloping angle and facilitate the discharge of bales therefrom. Upon discharge, the tail gate moves from an open to a closed position returning the bed to a bale receiving position.

To latch the tail gate 18 in place and to allow for release of the tail gate, a novel releasable lock means is provided. The lock means consists generally of a pair of bell cranks 47, each bell crank being pivoted to one of the angle brackets 40 by means of pins 48. One arm 50 of each bell crank 47 is disposed substantially in a horizontal position and projects rearwardly of the sides 12 and 14 whereby the terminal end of the arm of each bell crank lies alongside an edge of the tail gate 18. Adjacent the terminal end of each arm 50, is an undercut notch, slot or recess 52 which receives a laterally projecting bar 54 extending from the side edge of the tail gate 18 and in this manner, the tail gate 18 is held in closed position. To maintain the keeper bars 54 in latched position within the notches 52, the other arm 56 of each bell crank is interconnected to the end member 26 or 28 of one of the sides by means of a resilient means in the form of coil spring 58. The coil spring 58 yieldingly urges the arm 50 against the keeper bar 54.

To release the tail gate 18 from its latched position, flexible means in the form of cables 60 are secured at one of their ends to the arms 56 of the bell cranks and extend alongside the sides 12 and 14 of the trailer to the front end of the trailer. Extending transversely across the front end of the trailer and journalled for rotation in the sides thereof in any suitable manner is a rod 62 having rigid, upwardly extending levers 64 at the ends thereof. The other ends of the cables 60 are secured to these upwardly extending levers 64. An actuating lever 66 is secured to the central portion of the rod 62 and cable 68 is secured to this actuating lever 66 and terminates remotely therefrom, preferably on the baling machine or tractor, whereby the operator by pulling the cable 68 rocks the rod 62 thereby pivoting the bell cranks 46 and causing them to unlatch the keeper bars 54 and permit free swinging of the tail gate 18.

To permit the tail gate 18 keeper bars 54 to be relatched in the latching arms or bars 50, the terminal ends of the arms 50 are wedge shaped as at 70 to provide cam surfaces while a U-shaped guide 72 is mounted on the tongue 23 to contact the lever 66 so that the action of springs 58 will not pull the arms 50 very much below their horizontal position. Thus, as the tail gate 18 swings to its closing position, the keeper bars 54 engage the wedge-shaped ends 70 and slip into the notches 52.

As will be noted, the tongue 23 is stepped adjacent the attachment of the guide member 72 thereto while a clasp hitch 74 is formed at the forward end of the tongue and the wheel assembly 25 comprising square axle 76 and wheels 78 is secured to the rear end of the tongue. Intermediate its ends, the tongue is welded or otherwise secured to the front wall 16 of the trailer frame.

In operation, the forward end of the tongue 22 is pivotally secured by means of the clasp hitch 74 to the rear end of a baling machine whereby the chute 80 of the machine terminates adjacent the forward end of the trailer 10. As bales, indicated in dotted outline in Figure 1, are ejected from the baling machine, they flow from the chute 80 into the trailer 10. Since the baling machine generally circles to the right as it goes around a field, the bales come off the chute 80 at an angle to the trailer 10. It is for this reason, that the side wall 14 of the trailer is especially formed with the guide rail 24. By this particular construction of the side wall 14, the bales as they are ejected from the chute 80 are guided by the offset guide rail 24 onto the bottom 20 of the trailer. When a sufficient number of bales has been received in the trailer 10, the release cable 68 is pulled permitting the end gate 18 to open, the opening movement of the end gate causing the bottom 20 to tilt under the weight of the bales from its bale receiving to its bale dumping position and discharge the bales substantially simultaneously onto the field. With this bale carrier or trailer, the ease of gathering the bales is greatly facilitated as is the dumping or discharging in windows of such bales.

From the foregoing description, the construction and operation of the bale carrier are believed to be clearly apparent. However, since numerous modifications and changes will readily occur to those skilled in the art after a consideration of the foregoing specification taken in conjunction with the accompanying drawings, it is not desired to limit the invention to the exact construction shown and described. But, all suitable modifications may be resorted to falling within the scope of the appended claims.

Having described the invention, what is claimed as new is:

1. A trailer adapted for attachment to a baler for receiving and dumping bales, said trailer including a bottom, side walls, a front wall and a tail gate swingably mounted on the upper rear edges of said side walls, means pivotally securing said bottom to said side walls so that the bottom is freely swingable between the side walls, the major portion of said bottom being disposed rearwardly of said securing means, said tail gate including angulated portions at its upper end overlying said bottom, flexible means interconnecting said bottom rearwardly of said securing means and said tail gate angulated portions whereby downward swinging movement of said bottom causes said tail gate to open, and closing movement of said tail gate causing upward swinging movement of the bottom, and means releasably holding said tail gate in closed position.

2. A trailer adapted for attachment to a baler for receiving and dumping bales, said trailer including a bottom, side walls, a front wall and a tail gate swingably mounted at its upper end to the upper rear edges of said side walls, means pivotally securing said bottom to said side walls so that the bottom is freely swingable between the side walls, the major portion of said bottom being disposed rearwardly of said securing means, said tail gate including angulated portions at its upper end overlying said bottom, flexible means interconnecting said bottom rearwardly of said securing means and said tail gate angulated portions whereby downward swinging movement of said bottom causes said tail gate to open, and closing movement of said tail gate causing upward swinging movement of the bottom, and means releasably holding said tail gate in closed position, said holding means including bell cranks constituting latching bars pivotally connected to the rear ends of said side walls, one arm of each bell crank projecting rearwardly and lying along a side edge of said tail gate, a keeper bar projecting laterally from each side edge of said tail gate and engaged by one of said bell crank arms, and means secured to the other arm of each bell crank for pivoting it out of engagement with its keeper bar, the free end of said one arm of each bellcrank providing a cam surface, resilient means urging said one arm into locking engagement, said keeper bar riding said cam and lifting said one arm in opposition to the resilient means as the tail gate is swung to closed position to automatically lock the tail gate in closed position.

3. A trailer adapted for attachment to a baler for receiving and dumping bales, said trailer including a bottom, side walls, a front wall and a tail gate swingably mounted at its upper end to the upper rear edges of said side walls, means pivotally securing said bottom to said side walls so that the bottom is freely swingable between the side walls, the major portion of said bottom being disposed rearwardly of said securing means, flexible means interconnecting said bottom rearwardly of said securing means and said tail gate whereby downward swinging movement of said bottom causes said tail gate to open, and closing movement of said tail gate causing upward swinging movement of said bottom, and means releasably holding said tail gate in closed position, said tail gate including side members having angulated upper ends overlying a portion of said bottom, said flexible means extending from said angulated upper ends.

4. A bale carrier for attachment to a baling machine to receive and discharge bales dispensed from the machine, including a supporting frame, a bed pivotally mounted intermediate its ends on said frame, a tail gate on said frame, means connecting said bed and tail gate to one another whereby pivoting of the bed is controlled by opening and closing movement of the tail gate, and releasable means on said frame locking said tail gate against opening movement.

5. A bale carrier for attachment to a baling machine to receive and discharge bales dispensed from the machine, including a wheeled supporting frame, a bed pivotally mounted intermediate its ends on said frame, a tail gate on said frame, operating means connecting said bed and tail gate to one another whereby pivoting of the bed is controlled by opening and closing movement of the tail gate, and releasable means on said frame locking said tail gate against opening movement, said bed being downwardly and rearwardly inclined with respect to the supporting frame and having its rearward end terminating adjacent the tail gate so that bales will press against the tail gate, the pivotal mounting of said bed being toward the forward end of the bed.

6. A trailer adapted for attachment to a baling machine for receiving and dumping bales, said trailer including a bottom, side walls, a front wall and a tail gate including side members swingably mounting the tail gate at its upper edge to the upper rear edges of said side walls, means pivotally securing said bottom to said side walls with the major portion of said bottom being disposed rearwardly of said pivotal securing means, said tail gate side members having angulated upper ends thereon overlying said bottom, flexible means directly interconnecting said bottom rearwardly of said pivotal securing means and the angulated upper ends of said tail gate side members whereby the tilting movement of the bottom is dependent upon the opening and closing movement of the tail gate, and locking means automatically locking said tail gate in closed position.

7. A trailer adapted for attachment to a baling machine for receiving and dumping bales, said trailer including a bottom, side walls, a front wall and a tail gate including side members swingably mounting the tail gate at its upper edge to the upper rear edges of said side walls, means pivotally securing said bottom to said side walls with the major portion of said bottom being disposed rearwardly of said pivotal securing means, said tail gate side members having angulated upper ends thereon overlying said bottom, flexible means directly interconnecting said bottom rearwardly of said pivotal securing means and the angulated upper ends of said tail gate side members whereby the tilting movement of the bottom is dependent upon the opening and closing movement of the tail gate, and locking means automatically locking said tail gate in closed position, said tail gate having a laterally projecting keeper bar, said locking means being mounted on said side walls and including at least one arm projecting rearwardly along one side edge of said tail gate, said arm having a downwardly opening slot lockingly receiving said keeper bar, resilient means urging said arm into locking position, said arm having a cam surface formed thereon engaging said keeper bar as the tail gate is closing lifting the arm in opposition to the resilient means to seat the keeper bar in the slot.

8. A bale carrier for attachment to a baling machine to receive and discharge bales dispensed from the machine, said carrier including a supporting frame, a bed tiltably mounted on said frame for tilting movement between bale receiving and bale dumping positions, a tail gate carried by said frame, means associated with said tail gate and said frame for releasably retaining said tail gate in a closed position, and means operatively connecting said bed and tail gate for retaining the bed in a bale receiving position when the tail gate is closed, and returning the bed to a receiving from a dumping position when the tail gate moves from an open to a closed position.

9. A bale carrier for attachment to a baling machine to receive and discharge bales dispensed from the machine, said carrier including a supporting frame, a bed tiltably mounted on said frame for tilting movement between bale receiving and bale dumping positions, a tail gate carried by said frame, means associated with said tail gate and said frame for releasably retaining said tail gate in a closed position, and means operatively connecting said bed and tail gate for retaining the bed in a bale receiving position when the tail gate is closed, and returning the bed to a receiving from a dumping position when the tail gate moves from an open to a closed position, said bed being slanted toward said tail gate whereby the weight of a bale against the tail gate and the bed moves the tail gate to an open position upon release of said releasable retaining means, and facilitates tilting movement of said bed to a dumping position.

10. A bale carrier for attachment to a baling machine to receive and discharge bales dispensed from the machine, said carrier including a supporting frame, a floor tiltably mounted on said frame for movement between bale receiving and bale dumping positions, a tail gate carried by said frame, means carried by said frame and associated wtih said tail gate for locking said tail gate in a closed position, and means connecting said floor and tail gate to one another whereby the floor is retained from tilting movement when the tail gate is closed, said connecting means enabling said floor to tilt to a bale receiving position in response to closing movement of said tail gate.

11. A bale carrier adapted for attachment to a baler to receive and discharge bales dispensed from the baler, including a supporting frame, a bed tiltably carried by said frame for movement between a bale receiving and a bale dumping position, said frame including side walls extending above said bed to prevent bales from falling off the sides thereof, an end gate swingably carried by said frame, means on said frame and associated with said end gate releasably retaining said end gate in a closed position to retain bales on said bed, means connecting said end gate and bed permitting tilting of said bed to a dumping position when said end gate is opened and causing said bed to move from a dumping to a receiving position in response to closing movement of the end gate.

References Cited in the file of this patent

UNITED STATES PATENTS

| | | |
|---|---|---|
| 1,225,031 | Heiden | May 8, 1917 |
| 1,338,369 | Henderson | Apr. 27, 1920 |
| 1,833,282 | France | Nov. 24, 1931 |
| 2,037,491 | Wagoner | Apr. 14, 1936 |
| 2,316,435 | James | Apr. 13, 1943 |